US012176647B2

(12) United States Patent
Wrede et al.

(10) Patent No.: US 12,176,647 B2
(45) Date of Patent: Dec. 24, 2024

(54) MULTI-POLE PLUG CONNECTOR ASSEMBLY

(71) Applicant: KOSTAL Kontakt Systeme GmbH, Luedenscheid (DE)

(72) Inventors: Bernhard Wrede, Luedenscheid (DE); Alexander Nocker, Altena (DE)

(73) Assignee: KOSTAL Kontakt Systeme Gmbh & Co. KG, Luedenscheid (DE)

(*) Notice: Subject to any disclaimer, the term of this patent is extended or adjusted under 35 U.S.C. 154(b) by 601 days.

(21) Appl. No.: 17/542,627

(22) Filed: Dec. 6, 2021

(65) Prior Publication Data

US 2022/0094097 A1 Mar. 24, 2022

Related U.S. Application Data

(63) Continuation of application No. PCT/EP2020/068803, filed on Jul. 3, 2020.

(30) Foreign Application Priority Data

Jul. 4, 2019 (DE) ..................... 10 2019 004 712.5

(51) Int. Cl.
*H01R 13/627* (2006.01)
*H01R 13/436* (2006.01)
*H01R 13/639* (2006.01)

(52) U.S. Cl.
CPC ....... *H01R 13/4361* (2013.01); *H01R 13/639* (2013.01)

(58) Field of Classification Search
CPC ............ H01R 13/5812; H01R 13/6272; H01R 13/62927
See application file for complete search history.

(56) References Cited

U.S. PATENT DOCUMENTS 3,997,234 A * 12/1976 Worman ............ H01R 13/6335 439/456
4,708,413 A * 11/1987 Schroeder .......... H01R 13/6272 439/352
4,946,395 A * 8/1990 Cope .................. H01R 13/6272 439/352
5,037,175 A * 8/1991 Weber .................. G02B 6/4292 439/445
5,571,030 A 11/1996 Gladd et al.
(Continued)

FOREIGN PATENT DOCUMENTS

DE 69922451 T2 5/2005
WO 2019086949 A1 5/2019

OTHER PUBLICATIONS

The International Bureau of WIPO, International Preliminary Report on Patentability for International Application No. PCT/EP2020/068803, issued Dec. 28, 2021.
(Continued)

*Primary Examiner* — Neil Abrams
(74) *Attorney, Agent, or Firm* — Brooks Kushman P.C.

(57) ABSTRACT

A connector assembly includes a first connector housing, a second connector housing, and a connector position assurance (CPA) locking mechanism. The connector housings are connected via a detent connection. The CPA locking mechanism secures the detent connection against unintentional disconnection. The CPA locking mechanism forms a cable holder for fastening adjacent connecting lines.

14 Claims, 2 Drawing Sheets

(56) References Cited

U.S. PATENT DOCUMENTS

| | | | | |
|---|---|---|---|---|
| 5,803,651 | A * | 9/1998 | Saito | H01R 13/641 439/352 |
| 5,928,038 | A * | 7/1999 | Berg | H01R 13/6272 439/752 |
| 6,109,953 | A * | 8/2000 | Hashigaya | F21V 19/006 439/457 |
| 6,824,417 | B1 * | 11/2004 | Nimura | H01R 13/641 439/352 |
| 7,001,081 | B2 * | 2/2006 | Cox | G02B 6/38875 385/86 |
| 7,390,228 | B2 | 6/2008 | Rimke | |
| 7,500,867 | B1 * | 3/2009 | Doglio | H01R 13/5841 439/456 |
| 8,342,459 | B2 * | 1/2013 | Garrison | H01R 12/63 248/68.1 |
| 9,620,892 | B2 * | 4/2017 | Ng | H01R 13/5812 |
| 10,050,381 | B2 | 8/2018 | Wolter et al. | |
| 10,205,266 | B1 | 2/2019 | Peterson et al. | |
| 11,489,326 | B1 * | 11/2022 | Chung | H02G 11/00 |
| 2015/0162693 | A1 | 6/2015 | Ng et al. | |

OTHER PUBLICATIONS

European Patent Office, International Search Report for International Application No. PCT/EP2020/068803, dated Sep. 17, 2020.

German Patent and Trademark Office, German Search Report for corresponding German Patent Application No. 10 2019 004 712.5 dated Feb. 6, 2020.

* cited by examiner

MULTI-POLE PLUG CONNECTOR ASSEMBLY

CROSS-REFERENCE TO RELATED APPLICATIONS

This application is a continuation of International Application No. PCT/EP2020/068803, published in German, with an International filing date of Jul. 3, 2020, which claims priority to DE 10 2019 004 712.5, filed Jul. 4, 2019, the disclosures of which are hereby incorporated in their entirety by reference herein.

TECHNICAL FIELD

The present invention relates to a multi-pole ("multipole") plug connector assembly including a first plug connector having a first plug connector housing and a second plug connector having a second plug connector housing, wherein multiple electrical contact elements are arranged in both plug connector housings, of which at least the contact elements of the first plug connector housing are connected to respective connecting lines (e.g., cables), and wherein the plug connector housings are connected to one another via a detent connection secured by a connector position assurance (CPA) locking mechanism against unintentional disconnection.

BACKGROUND

A multipole plug connector assembly of this type is known from German Patent application DE 10 2015 009 039 A1 (corresponding to U.S. Pat. No. 10,050,381), for example.

For multipole plug connector assemblies, it becomes increasingly difficult to lead away the connecting lines (e.g., cables), attached to the electrical contact elements, in an orderly manner as the number of poles increases. A common procedure is to combine outgoing connecting lines with connecting elements, such as cable ties, to form cable bundles or trunk bundles. However, unless special fastening sites for the connecting elements are present at the plug connector housings or in the attachment surroundings, there is generally not sufficient fixing of the cable bundle thus formed.

Another known option for fixing connecting lines is to provide the plug connector housings with a multipart design in each case, and to enclose the connecting lines between the housing parts when the housing parts are joined together. However, this results in plug connector housings which have complex designs, and which are therefore relatively expensive.

SUMMARY

An object is to provide a plug connector assembly that enables the fastening of a relatively large number of connecting lines (e.g., cables) with a particularly low material outlay and installation effort.

Embodiments of the present invention achieve this object in that a connector position assurance (CPA) locking mechanism (e.g., CPA bolt or CPA bar) for securing the plug connector housings together at the same time forms a cable holder for fastening multiple adjacent connecting lines routed in parallel.

In an embodiment, a multi-pole plug connector assembly includes a first plug connector having a first plug connector housing, a second plug connector having a second plug connector housing, and a connector position assurance (CPA) locking mechanism. Multiple contact elements are arranged in each of the plug connector housings. The contact elements of at least the first plug connector housing are connected to connecting lines. The plug connector housings are connected to one another via an engaging connection. The CPA locking mechanism secures the engaging connection between the plug connector housings against unintentional separation. The CPA locking mechanism also forms a connection line holder (i.e., a cable holder) for securing multiple parallel adjacent connection lines routed in parallel. The CPA locking mechanism thereby simultaneously secures (i) the engaging connection between the plug connector housings against unintentional disconnection and (ii) the multiple adjacent connection lines routed in parallel.

The CPA locking mechanism may advantageously be designed as an individual part that is fabricated independently of the plug connector housings and that is lockable or latchable to at least one of the plug connector housings by insertion (i.e., by being plugged into the at least one of the plug connector housings).

The portion of the CPA locking mechanism that forms the cable holder may particularly advantageously be designed as a spring clamp (or spring clip) made up of two oppositely situated spring arms. Connecting lines bundled in parallel may easily be inserted into the spring clamp between the spring arms for being clamped together by the spring arms. That is, connecting lines bundled in parallel can be easily inserted into the spring clamp and held by the spring clamp.

It may also advantageously be provided to combine the connecting lines to form a cable bundle, using a connecting element, before insertion into the spring clamp.

In carrying out at least one of the above and/or other objects, a connector assembly is provided. The connector assembly includes a first connector housing, a second connector housing, and a CPA locking mechanism. The connector housings are connected via a detent connection (or latching connection or engaging connection). The CPA locking mechanism secures the detent connection against unintentional disconnection. The CPA locking mechanism forms a cable holder for fastening adjacent connecting lines. The cable holder of the CPA locking mechanism may be a spring clamp having a pair of spring arms.

BRIEF DESCRIPTION OF THE DRAWINGS

An exemplary embodiment of a multipole plug connector assembly in accordance with the present invention is illustrated with reference to the drawings and explained in greater detail below. In the drawings.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
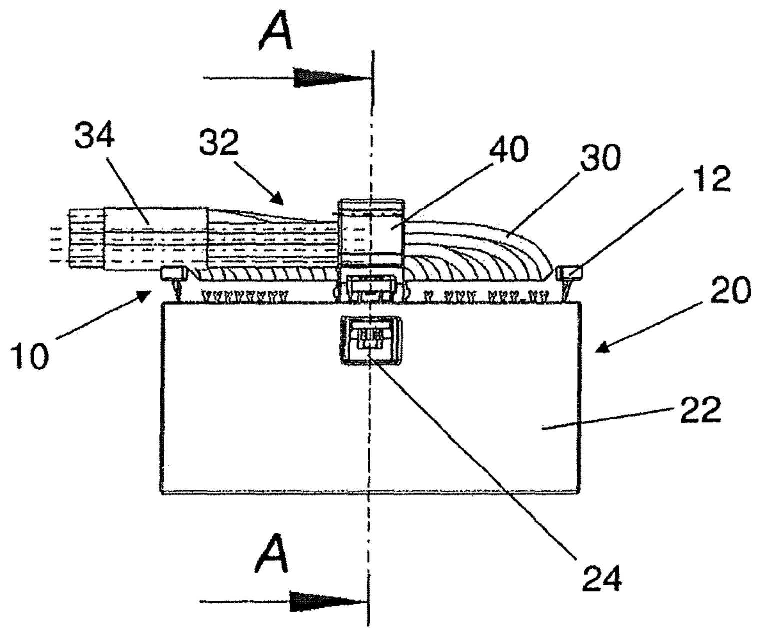
FIG. 1 illustrates the plug connector assembly in a completely installed (i.e., fully assembled) state.
Figure 2:
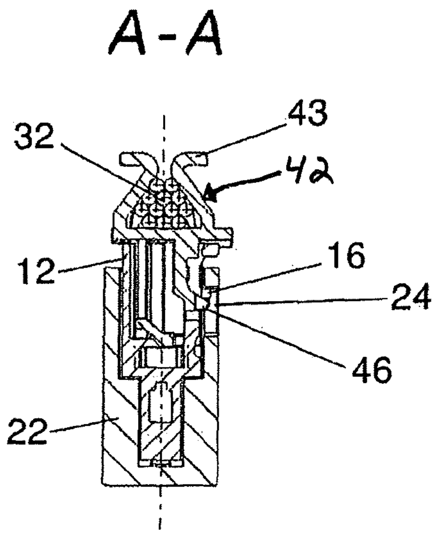
FIG. 2 illustrates a cross-sectional view of the plug connector assembly in the completely installed state along the line A-A of FIG. 1.

Referring now to FIGS. 1 and 2, a multipole plug connector assembly according to an exemplary embodiment of the present invention in a completely installed (i.e., fully assembled) state is shown. FIG. 2 illustrates a cross-sectional view of the plug connector assembly along the line A-A of FIG. 1. The plug connector assembly includes a first plug connector 10, a second plug connector 20, and a connector position assurance (CPA) locking mechanism 40. First plug connector 10 includes a first plug connector housing 12. Second plug connector 20 includes a second plug connector housing 22. First and second plug connector housings 12 and 22 are connected (i.e., joined) together. CPA locking mechanism 40 secures the connection between plug connector housings 12 and 22 against unintentional disconnection or separation.

CPA locking mechanism 40, on its side protruding from plug connector housings 12 and 22, includes a cable holder 42. Cable holder 42 has two mutually facing spring arms 43 (best shown in FIGS. 2, 3, and 4) which form a spring clamp. Cable holder 42 is for holding a cable bundle 32 of connecting lines 30. In this regard, spring arms 43 of cable holder 42 clamp together cable bundle 32 of connecting lines 30 inserted therein.

First and second plug connector housings 12 and 22 each include mutually connectable electrical contact elements (not shown), such as push-on sleeve contacts and plug connector pins.

Figure 3:
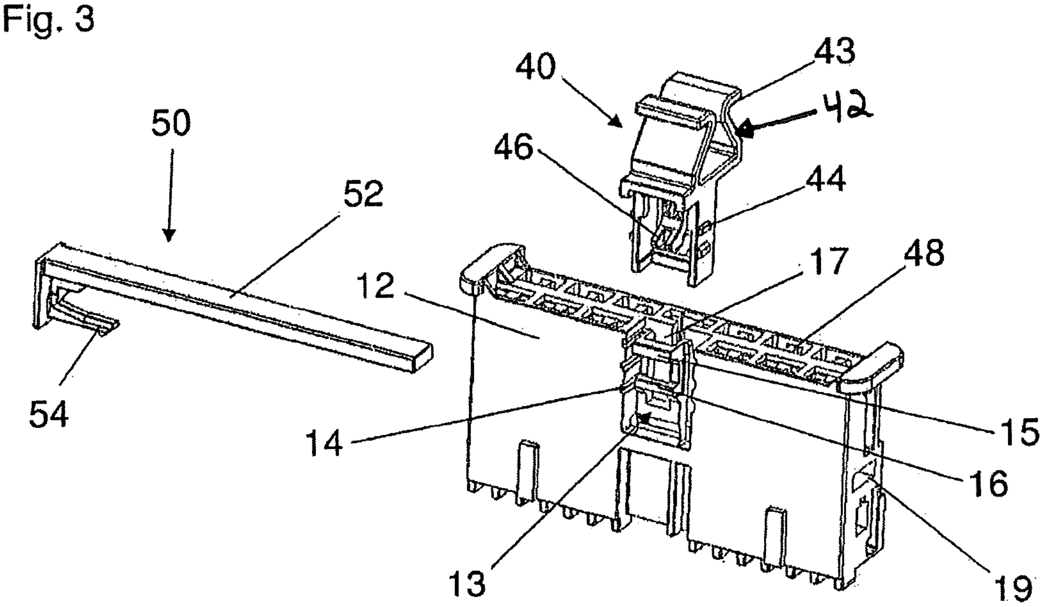
FIG. 3 illustrates a first plug connector housing of a first plug connector of the plug connector assembly and a connector position assurance (CPA) locking mechanism of the plug connector assembly.

FIG. 3 illustrates both of first plug connector housing 12 and CPA locking mechanism 40 as individual parts. First plug connector housing 12 has multiple holding or receiving chambers 48 arranged in two parallel rows. Holding chambers 48 are provided for holding electrical contact elements (not shown) arranged in first plug connector housing 12 in a locked position.

The plug connector assembly further includes a locking slide 50, also depicted in FIG. 3. Locking slide 50 has a cuboidal locking plate 52 of an elongated design and a detent lever (or latching lever) 54.

After the electrical contact elements have been inserted into holding chambers 48, locking plate 52 of locking slide 50 is inserted into a locking channel 19 passing through the entire length of first plug connector housing 12. Detent lever 54 situated at locking slide 50 thereby locks with first plug connector housing 12, thus fixing locking slide 50 to first plug connector housing 12. Locking plate 52 inserted into locking channel 19 engages in each case behind an open space at the electrical contact elements, thus bringing about secondary locking of all electrical contact elements. The principle of such locking is known from German Patent specification DE 103 32 892 B4 (corresponding to U.S. Pat. No. 7,390,228), for example.

As shown in FIG. 3, first plug connector housing 12 has a recess 13 in the housing wall in the middle of one of its longitudinal sides. Two bracket-like detent (or latching) elements 15 and 16 are provided one on top of the other at recess 13 in the housing wall of first plug connector housing 12. An elastic lever 17 is situated within recess 13.

As further shown in FIG. 3, CPA locking mechanism 40 includes two locking bars 44. Locking bars 44 are integrally formed one on top of one another on side faces of the CPA locking mechanism. A projection molding that forms a wedge 46 is between the side faces of CPA locking mechanism 40.

As further shown in FIG. 3, three locking grooves 14 are integrally formed one on top of the other in the housing wall of first plug connector housing 12 on both sides next to recess 13 in the housing wall. Locking grooves 14 are provided to cooperate or interact with locking bars 44 of CPA locking mechanism 40.

CPA locking mechanism 40 is lockingly or latchingly connectable to first plug connector housing 12 via locking bars 44 of the CPA locking mechanism and locking grooves 14 of first plug connector housing 12. The cooperation of locking bars 44 and locking grooves 14 enables at least two latching positions of CPA locking mechanism 40 on first plug connector housing 12. The two latching positions are referred to below as a pre-latching position and a final latching position.

In the completely installed state of the plug connector assembly, shown in FIGS. 1 and 2, CPA locking mechanism 40 is in the final latching position at first plug connector housing 12.

Figure 4:
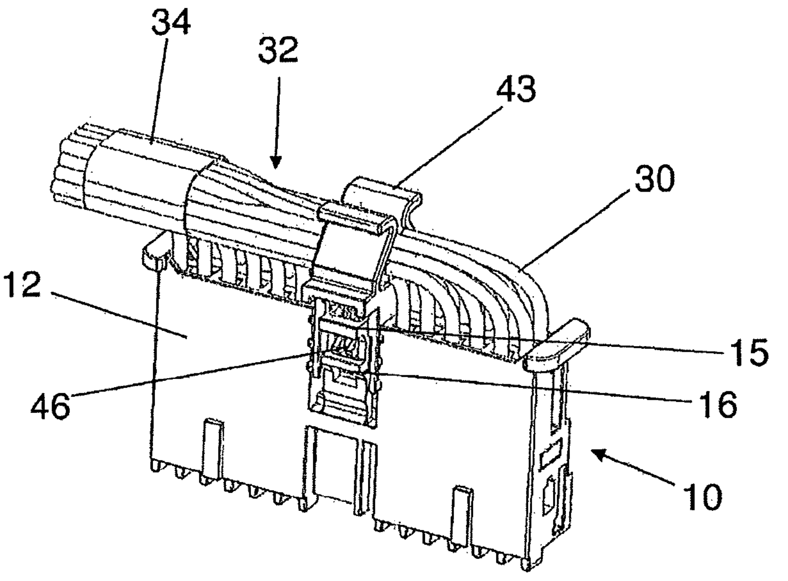
FIG. 4 illustrates the first plug connector housing together with the CPA locking mechanism, the CPA locking mechanism being in a pre-latching position at the first plug connector housing and connecting lines (e.g., cables) connected to electrical contact elements of the first plug connector housing being grouped together into a cable bundle that is secured by a cable holder of the CPA locking mechanism.

FIG. 4 illustrates CPA locking mechanism 40 in the pre-latching position on first plug connector housing 12. Further shown in FIG. 4, connecting lines (e.g., cables) 30 connected to electrical contact elements of first plug connector housing 12 are installed in a cable bundle 32.

In the pre-latching position of CPA locking mechanism 40 shown in FIG. 4, each of the two locking bars 44 of the side faces of CPA locking mechanism 40 is inserted into the top two locking grooves 14 in recess 13 in the housing wall of first plug connector housing 12. Wedge 46 of CPA locking mechanism 40 is thereby situated between upper detent element 15 and lower detent element 16 at recess 13.

Elastic lever 17 situated within recess 13 in the housing wall of first plug connector housing 12 is thus still pivotable or swivel-able so that when first plug connector housing 12 is connected (i.e., joined) to second plug connector housing 22, lower detent element 16 may snap into a detent (or latching) recess 24 of second plug connector housing 22 (shown in FIG. 2).

CPA locking mechanism 40 is subsequently brought into its final latching position by being pushed downward, resulting in the completely installed state illustrated in FIGS. 1 and 2.

As shown in the cross-sectional view in FIG. 2, in the final latching position of CPA locking mechanism 40, wedge 46 of the CPA locking mechanism engages beneath lower detent element 16 and fixes it in detent recess 24 of second plug connector housing 22. The movability of elastic lever 17 is thus cancelled at the same time. Plug connector housings 12 and 22 are thus inseparably connected as long as CPA locking mechanism 40 is left in its final latching position.

Even when CPA locking mechanism 40 is in the pre-latching position illustrated in FIG. 4, and of course also when CPA locking mechanism 40 is in the final latching position illustrated in FIGS. 1 and 2, CPA locking mechanism 40 fulfills the additional function of fixing connecting lines 30, which are connected to the electrical contact elements of first plug connector part 10, to first plug connector housing 12. For this purpose, connecting lines 30, which are combined to form a cable bundle 32, are inserted into spring arms 43 of cable holder 42 of CPA locking mechanism 40. Connecting lines 30 may be combined to form cable bundle 32 by using an additional connecting element 34 such as a cable tie or an adhesive tape.

Due to the clamping force of the two spring arms 43 of cable holder 42, cable bundle 32 of connecting lines 30 is fixed in an outgoing direction that is approximately at a right angle to the plug-in direction of the two plug connectors 10 and 20.

LIST OF REFERENCE NUMERALS

10 first plug connector (first connector)
12 first plug connector housing (first connector housing)
13 recess
14 locking grooves
15 upper detent element (upper locking element; upper latching element)
16 lower detent element (lower locking element; lower latching element)
17 elastic lever (resilient lever)
19 locking channel
20 second plug connector (second connector)
22 second plug connector housing (second connector housing)
24 detent recess (locking recess) (latching recess)
30 connecting line(s) (cable(s))
32 cable bundle (trunk group)
34 connecting element
40 CPA locking mechanism (CPA bar, CPA bolt)
42 spring clamp (cable holder; connecting line holder)
43 spring arms
44 locking bars
46 wedge
48 holding chambers (receiving chambers)
50 locking slide
52 locking plate
54 detent lever (locking lever) (latching lever)

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A connector assembly comprising:
a first connector housing;
a second connector housing connected to the first connector housing along a plug- in direction via a detent connection; and
a connector position assurance (CPA) locking mechanism that secures the detent connection against unintentional disconnection, wherein the CPA locking mechanism forms a cable holder for fastening adjacent connecting lines, the cable holder being a spring clamp having a pair of opposing spring arms, and the connecting lines are inserted into the spring clamp in an incoming direction along an axis that is at a right-angle to the plug-in direction and held by a clamping force of the spring arms in an outgoing direction along the axis.

2. The connector assembly of claim 1 wherein:
the CPA locking mechanism is an individual part existing independent of the first and second connector housings.

3. The connector assembly of claim 1 wherein:
the CPA locking mechanism is lockable to at least one of the first and second connector housings by insertion.

4. The connector assembly of claim 1 wherein:
the connecting lines are received by receiving chambers of the first connector housing.

5. The connector assembly of claim 1 wherein:
the connecting lines are combined by a connecting element to form a cable bundle.

6. A multipole plug connector assembly comprising:
a first plug connector having a first plug connector housing;
a second plug connector having a second plug connector housing;
a connector position assurance (CPA) locking mechanism;
wherein multiple electrical contact elements are arranged in both of the first and second plug connector housings;
the first and second plug connector housings are connected to one another along a plug-in direction via a detent connection that is secured by the CPA locking mechanism against unintentional disconnection; and
the CPA locking mechanism forms a cable holder for fastening multiple adjacent connecting lines routed in parallel, the connecting lines being inserted into the cable holder in an incoming direction along an axis that is at a right-angle to the plug-in direction and fastened by the cable holder in an outgoing direction along the axis, and the connecting lines being connected to the electrical contact elements arranged in the first plug connector housing.

7. The multipole plug connector assembly of claim 6 wherein:
the CPA locking mechanism is an individual part that is fabricated independently of the first and second plug connectors and is lockable to at least one of the first and second plug connector housings by insertion.

8. The multipole plug connector assembly of claim 7 wherein:
the cable holder of the CPA locking mechanism is a spring clamp.

9. The multipole plug connector assembly of claim 6 wherein:
the cable holder of the CPA locking mechanism is a spring clamp having a pair of spring arms.

10. The multipole plug connector assembly of claim 6 wherein:
the connecting lines are combined by a connecting element to form a cable bundle.

11. An assembly comprising:
a connecting element for combining a plurality of connecting lines into a cable bundle; and
a multipole plug connector assembly including a first plug connector having a first plug connector housing, a second plug connector having a second plug connector housing, and a connector position assurance (CPA) locking mechanism, wherein multiple electrical contact elements are arranged in both of the first and second plug connector housings, the electrical contact elements arranged in the first plug connector housing being connected to the connecting lines, and the first and second plug connector housings are connected to one another along a plug-in direction via a detent connection that is secured by the CPA locking mechanism against unintentional disconnection; and wherein the CPA locking mechanism forms a cable holder which receives the cable bundle of connecting lines inserted therethrough in parallel along an axis at a right-angle to the plug-in direction and thereby fastens the connecting lines routed therethrough in parallel along the axis.

12. The assembly of claim 11 wherein:

the cable holder of the CPA locking mechanism is a spring clamp having a pair of spring arms.

13. The assembly of claim 11 wherein:

the CPA locking mechanism is an individual part existing independent of the first and second plug connectors.

14. The assembly of claim 13 wherein:

the CPA locking mechanism is lockable to at least one of the first and second connector housings by insertion.

* * * * *